Aug. 28, 1956
A. G. TALBERT ET AL
2,760,784
DETACHABLE REAR AXLE UNIT
Filed July 10, 1953
3 Sheets-Sheet 1
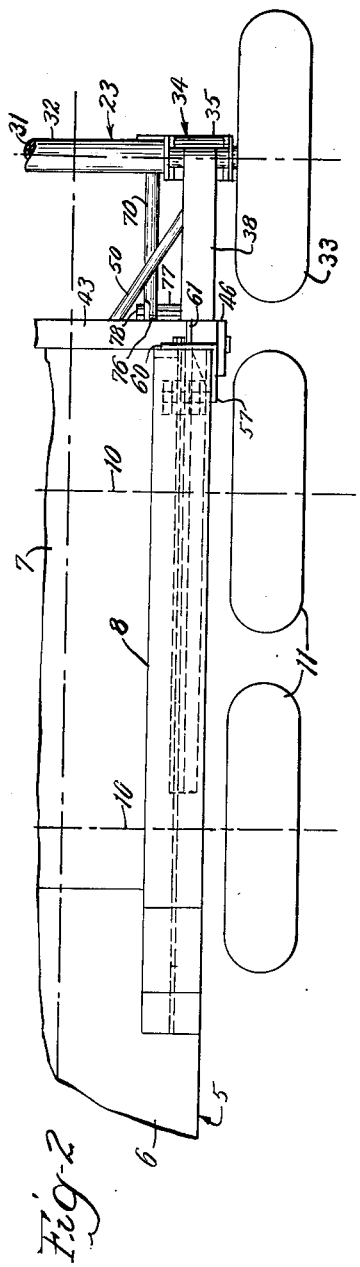
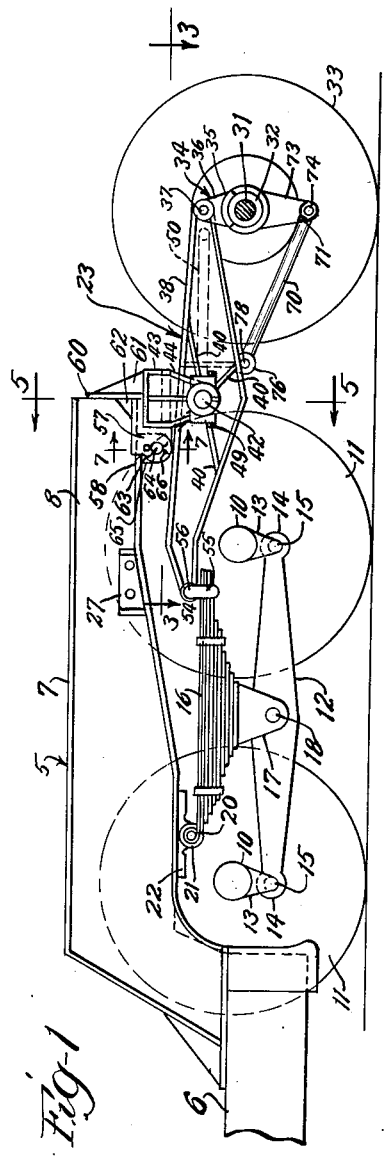
INVENTORS.
Austin G. Talbert &
Anthony Polich, Jr.
By:— Cromwell, Greist & Warden
Attys.

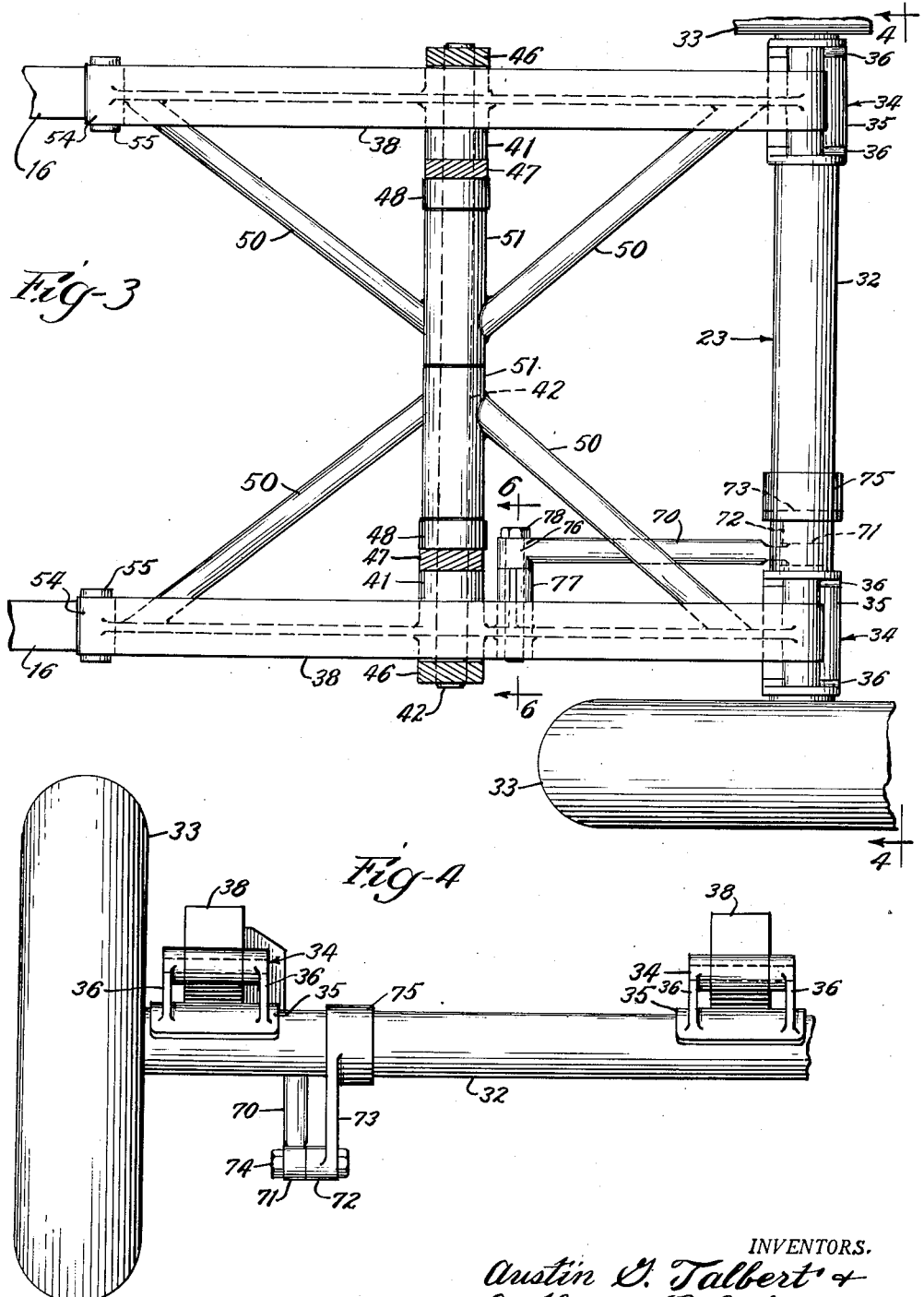

Aug. 28, 1956 A. G. TALBERT ET AL 2,760,784
DETACHABLE REAR AXLE UNIT
Filed July 10, 1953 3 Sheets-Sheet 3
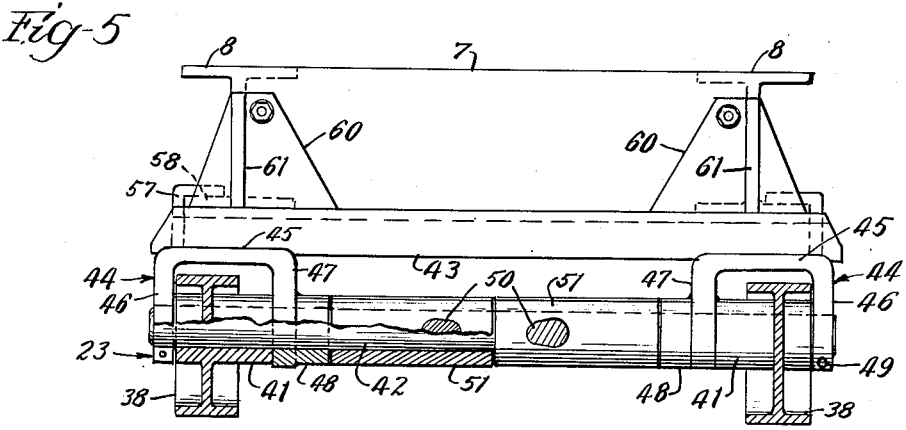
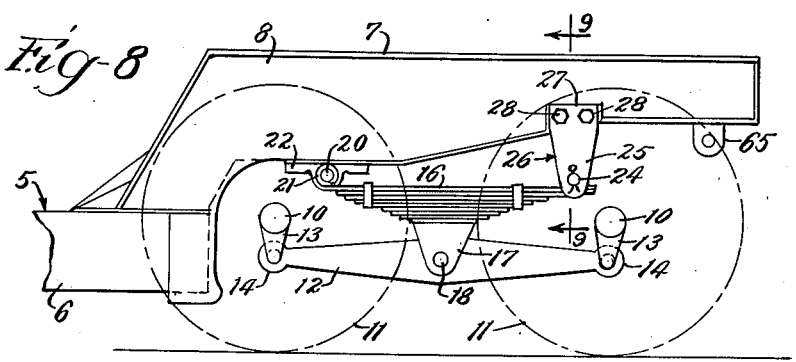
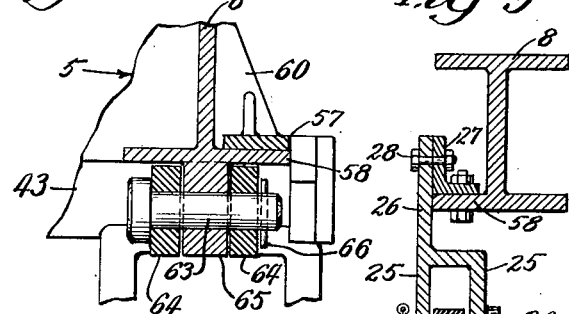
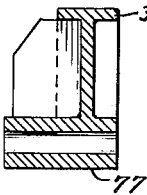
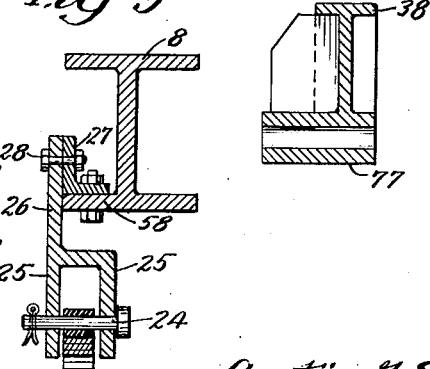
INVENTORS.
Austin G. Talbert &
Anthony Polich, Jr.
By: Cromwell, Greist & Warden
Attys.

United States Patent Office 2,760,784
Patented Aug. 28, 1956

2,760,784

DETACHABLE REAR AXLE UNIT

Austin G. Talbert, Lyons, and Anthony Polich, Jr., Brookfield, Ill., assignors to Talbert Construction Equipment Company, Lyons, Ill., a corporation of Illinois Application July 10, 1953, Serial No. 367,194

8 Claims. (Cl. 280—104.5)

This invention relates, generally, to detachable rear axle units for heavy duty vehicles such as highway trucks and trailers. A large proportion of such heavy duty vehicles have tandem rear axles, and therefore, this invention may be said to pertain to detachable third-axle units for such vehicles.

In the trucking industry and construction business there is often a need for additional load-supporting wheels and axles whereby heavy loads may be uniformly distributed to a greater number of wheels and axles. For example, many low-bed semi-trailers are now in use in the construction business for cross-country transporting heavy machinery such as cranes and earth movers, which themselves have low highway mobility. These heavy duty semi-trailers usually have bogey units on the rear ends of the type having tandem axles interconnected on opposite sides by load-distributing or equalizing beams whereby the load will be evenly distributed on each wheel and axle while allowing each wheel to individually accommodate itself to irregularities in the road. Instances frequently arise wherein it is desired to transport an unusually heavy load on one of these trailers, the load being of such magnitude that the bearing pressure exerted by each wheel exceeds the permissible limit for a particular highway. Thus, most states have statutes limiting the bearing load which may be carried by each wheel of a truck or trailer. In other instances occasions arise in which it is desired to transport a normal load over a road or highway which is in poor condition and wherein greater than normal distribution of the load on additional axles and wheels would be highly desirable.

Generally stated, the object of the present invention is a detachable axle unit adapted to be readily and conveniently attached and detached as needed, to and from the rear end of a heavy duty vehicle such as a truck or trailer, which unit when attached serves to support the desired portion of the load, thereby spreading out or distributing the load so as to decrease the load carried by any one axle.

A further object of the invention is a provision of such a detachable axle unit, which has a simple and rugged construction, which is relatively inexpensive to manufacture, and which can be used or readily adapted for use with most trucks and trailers.

Certain other objects of the invention will, in part, be obvious and will, in part, appear hereinafter.

For a more complete understanding of the nature and scope of the invention, reference may now be had to the following detailed description above, taken in connection with the accompanying drawings, wherein:

Fig. 1 is a side elevational view of the rear end of a low-bed semi-trailer having a detachable rear axle unit constituting one embodiment of the present invention attached thereto so as to provide one additional axle onto which the load on the trailer may be distributed.

Fig. 2 is a fragmentary top plan view showing one side of the embodiment of the invention as shown in Fig. 1.

Fig. 3 is an enlarged horizontal sectional view taken on line 3—3 of Fig. 1, certain parts being broken away;

Fig. 4 is a fragmentary rear end elevational view of the detachable rear axle unit taken on line 4—4 of Fig. 3;

Fig. 5 is a vertical section view on the scale of Figs. 3 and 4, taken on line 5—5 of Fig. 1, certain parts being shown in elevation and certain parts being broken away;

Fig. 6 is a detail sectional view taken on line 6—6 of Fig. 3;

Fig. 7 is an enlarged detail sectional view taken on line 7—7 of Fig. 1;

Fig. 8 is a side elevational view of the rear end of the low-bed semi-trailer shown in Fig. 1 as used when the rear axle unit is detached; and Fig. 9 is a detail sectional view on enlarged scale taken on line 9—9 of Fig. 8.

Referring to Figs. 1 and 2 of the drawings the reference numeral 5 designates, generally, a low-bed semi-trailer of the type shown, for example, in Talbert Patent No. 2,489,112, dated November 22, 1949. The details of construction of the trailer 5 are not important insofar as the present invention is concerned, and it will be sufficient to mention that it comprises a low-bed platform portion 6 from the rear end of which rises and extends rearwardly a frame portion 7, which includes a pair of I-beam frame members 8—8 (Figs. 2 and 5) which extend longitudinally along opposite sides of the trailer.

The rear end of the trailer 5 is normally supported by a tandem rear axle unit which is located underneath the elevated frame 7. The construction of one side of the trailer 5 is identical with that on the other, except that one is right-handed and the other is left-handed. Therefore, it will suffice to describe and show only one side of the tandem wheel support, it being understood that the other side corresponds. Referring, therefore, to Figs. 1 and 2, a pair of tandem axles 10—10 are indicated, which extend transversely underneath the raised frame portion 7 and which have ground engaging wheels 11—11 mounted on opposite ends thereof. In many instances the wheels 11 will be of the dual type. Interiorly of each of the sets of wheels 11—11, an equalizing beam 12 is provided which extends between adjacent ends of the axles 10—10 and is pivotally supported or connected thereto by means of brackets or hangers 13—13. The beams 12 are sometimes referred to as "walking beams." The lower ends of the brackets 13 are bifurcated so as to fit over eyes 14—14 formed on the opposite ends of each beam. A pin 15 is inserted through each eye 14 and the registering holes in the bottom ends of the brackets 13.

The weight of the trailer 5 is supported on the axles 10—10 and in turn on the wheels 11—11 by means of leaf springs 16—16, one of which is located on each side of the trailer, as shown in Fig. 1. Each of the leaf springs 16 is mounted at its mid-point on the top of a saddle 17, which straddles the middle of the adjacent equalizer beam 12 and is pivotally connected thereto by means of a pin 18. Each of the leaf springs 16—16 is pivotally connected at its front end to the underside of the adjacent I-beam frame member 8, by means of a pin 20 which extends through an eye 21 formed on the front end of the spring and the registering hole in a bracket fixture 22 secured to the underside of the frame member.

When the vehicle or trailer 5 is supported only on its own tandem axles 10—10 as shown in Fig. 8 (the detachable rear axle unit indicated generally at 23 in Figs. 1 and 2 being removed) then the rear end of each of the leaf springs 16 fits underneath a pin 24 extending between opposite forks or guide plates 25—25 of a fixture 26 which is secured to an L-shaped bracket 27 attached by means of a pair of bolts 28—28 to the adjacent side frame member 8 which extend through registering holes in the fixture 26 and in the bracket 27, as shown.

The third axle unit 23 comprises an axle 31 which extends through an axle housing 32 and projects from opposite ends thereof so that the supporting wheels 33—33 may be attached to opposite ends. As in the case of the wheels 11—11, the wheels 33—33 may be either single type wheels or dual type wheels.

A pair of brackets 34—34 are welded or otherwise secured adjacent opposite ends of the axle housing 32 (Figs. 1 and 4). These brackets 34 each comprise a base plate portion 35 (Fig. 4), which is curved so as to conform to the contour of the axle housing, and these plates are welded around the margin to the axle housing 32. A pair of arms 36—36 project upwardly from opposite sides of each of the base plates 35 so as to support between the upper ends thereof a bearing pin 37. The pins 37 serve as bearing supports for the rear ends of a pair of load distributing beams 38—38. The rear end of each of these beams 38—38 is provided with an eye through which the pins 37 pass. It will be understood that the brackets 34—34 are aligned on the axle housing 32 so that the pins 37 will be in substantial coaxial alignment.

The load transmitting beams 38 are shaped as shown in Fig. 1 in side elevation and in cross-section have an I-beam shape, as shown in Fig. 5. For added strength, reinforcing webs 40 (Fig. 1) may be provided on the middle portion of each beam 38.

Each of the load transmitting beams 38 is provided at its middle with a transversely extending sleeve bearing 41, which extends through and which is welded to the vertical web of each beam 38, as shown in Figs. 3 and 5. The sleeve bearings 41 serve as journals for the opposite ends of a transverse support shaft 42 (Fig. 5). The sleeve bearings 41 permit the beams 28 to turn independently on the opposite ends of the shaft 42.

A bolster 43 which may be an inverted channel member is supported on the opposite ends of the shaft 42 by means of a pair of saddles 44—44, which have inverted U-shapes, as shown in Fig. 5. Each of the saddles 44 has a yoke portion 45 supported by fork portions 46 and 47, each of which is provided with an opening through which the shaft 42 extends as shown in Fig. 5. In order to provide additional bearing areas, a collar 48 is welded onto each of the inner forks 47 of each yoke 44, as shown in Fig. 5. The bottom end of each of the outer forks 47 is split and provided with registering holes through which a tightening bolt 49 extends. By tightening the bolts 49 the yokes may be rigidly clamped to the ends of the shaft 42. The bolster 43 is welded at opposite ends to the upper sides of the yokes 45. It will be seen that this arrangement permits the bolster 43 and the saddles 44 to remain stationary while the beams 38 turn or tilt as required on the opposite ends of the shaft 42.

In order to provide added rigidity to the third axle unit 23, each of the beams 38 may be provided with a pair of tubular braces 50—50, as shown in Fig. 3. Each of the braces 50 is welded to one of the beams 38 adjacent one end thereof, and the inner end of each brace is welded to one side of a sleeve member 51, which fits over the shaft 42. The inner ends of the sleeves 51 are spaced apart slightly at approximately the midpoint of the shaft 42 so that they may turn independently on the shaft 42. The outer ends each of the sleeve members 51 are slightly spaced from the opposing end of the adjacent collar member 48 as shown in Fig. 3. If desired, pieces of canvas or other covering material may be wrapped around the juxtaposed inner ends of the sleeves 51 and the juxtaposed ends of the sleeves 51 and the collars 48 so as to keep out dirt from these locations.

The front end of each of the beams 38 is provided with an eye 54 from which a two-sided link 55 is pivoted by means of a pin 56 extending through the opposite sides of the link and through the eye 54. When the axle unit 23 is attached to the rear of a vehicle as shown in Fig. 1, each link 55 fits over the adjacent rear end of the leaf spring 16 with the eye 54 bearing down onto the spring.

In order to provide a convenient and rigid attachment of the additional axle unit 23 to the rear end of the trailer 5, the top level of the bolster 43 is such that it fits underneath the rear ends of the two side frame members 8—8, as shown in Figs. 1 and 5. To each end of the bolster 43 and the adjacent saddle 44 there is welded a hook member 57 which projects forwardly of the bolster so as to slide over the bottom outside flange 58 of the adjacent side frame member 8, as shown in Figs. 1 and 6. Vertical plates 60—60 of the generally triangular shape shown in Figs. 5 and 6 are welded to the top of the bolster 43 adjacent each end thereof so as to project vertically above the center thereof in the position shown in Fig. 1. Each of the vertical plates 60 is strengthened by means of a rearwardly extending gusset 61 and forwardly extending gusset 62.

The axle unit 23 is rigidly coupled to the rear end of the trailer 5 by means of pins 63—63 (Fig. 6) each of which projects through registering holes in a pair of spaced ears 64—64 welded to and projecting forwardly from each end of the bolster 43 so as to straddle an apertured ear 65 depending from the underside of each side frame member 8. A cotter pin 66 serves to secure each of the locking pins 63 in place.

A torque rod 70 (Figs. 1 and 4) is provided to retain the third axle 31 in the proper position. The lower rear end of the torque rod 70 is provided with an eye 71 which is pivotally connected to an eye 72 integrally formed on the bottom end of a bracket arm 73 by means of a bolt 74 extending through the eyes 71 and 72. The depending bracket arm 73 is integrally formed on the bottom end of a collar 75 which is secured to the axle housing 32.

The forward and upper end of the torque rod 70 is provided with an eye 76 which is pivotally connected to the adjacent I-beam 38, which is provided with a laterally extending, integrally formed, sleeve 77 (Figs. 3 and 7) on the underside thereof. A pin 78 extends through the registering apertures in the eye 76 and the sleeve 77.

It will be noted in Fig. 1 that the load-transmitting I-beams 38 of the third axle unit 23 are pivoted at their mid-points to the support shaft 42. Accordingly, the leverage arms on opposite sides of the shaft 42 are equal so that the bearing load on the bolster 43 is equally distributed to the third axle 31 and to the rear end of the leaf springs 16—16. By means of this arrangement, when the third axle unit 23 is attached as shown in Fig. 1, the load supported at the rear end of the trailer 5 is equally distributed between the tandem axles 10—10 and the third axle 31. It will be understood that by pivoting the load-transmitting beams 38 to the shaft 42 at some point other than at the middle, the proportion of the load which is carried by the third axle 31 may be changed as desired. Thus, if the beams 38 are pivoted on the shaft 42 at a point nearer to the front end of the beams than to the rear, the lever arm for the third axle 31 will be increased and the proportion of the load carried thereby will be decreased.

The third axle unit 23 may be attached to the rear end 7 of the low-bed trailer 5 as follows: a block or jack (not shown) is suitably put under the rear end 7 so as to support the rear end of the leaf springs 16 when the pins 24 (Fig. 9) are removed and the brackets 26 detached. The third axle unit 23 is then brought up from the rear and the hook members 57—57 are guided over to the rear ends of the flanges 58 and then the third axle unit 23 is shoved forwardly until the vertical plates 60 engage the rear ends of the side frame members 8 and the apertures in each pair of forwardly projecting ears 64 comes into registration with the aperture in the adjacent lug or ear 65 depending from the side frame member 8. The pins 63 are then put in place and the cotter pins 66 inserted. The jack or blocks for temporarily supporting the rear end 7 may now be removed and the unit is ready for the road.

To detach the third axle unit 23 the foregoing procedure is reversed. It will be seen that the third axle unit 23 may be conveniently and quickly attached and detached as desired.

While the third axle unit 23 has been shown in conjunction with a vehicle having a tandem axle support, it will be understood that it could be also used in conjunction with a vehicle having only a single axle support.

Since certain changes may be made in the embodiment of the invention described above and shown in the accompanying drawings, and since other embodiments of the invention may be made without departing from the spirit and scope of the invention, all matters described above or shown in the accompanying drawings are intended to be interpreted as illustrative and not in a limiting sense.

What is claimed as new is:

1. In combination with a wheel-supported vehicle having a frame, axle means extending transversely of said frame, support wheels mounted on opposite ends of said axle means, a spring on each side of said vehicle extending longitudinally of said frame, means for pivotally connecting the front end of each spring to said frame, removable means for pivotally connecting the rear end of each spring to said frame, and means for pivotally interconnecting the mid-point of each spring to the adjacent end of said axle means whereby weight on each spring is equally transmitted to the adjacent end of said axle means, a detachable axle unit comprising, bolster means, means for detachably connecting said bolster means in rigid weight supporting relationship to the rear end of said vehicle frame, an axle positioned rearwardly of said bolster means and extending transversely of said unit, wheels mounted on opposite ends of said axle, a longitudinally extending load-distributing beam on each side of said unit pivotally connected at a point intermediate its ends to the adjacent end of said bolster means, and means for pivotally supporting the rear end of each of said beams on the adjacent end of said axle, the forward end of each of said beams being adapted to be connected in load-transmitting relationship to the rear end of each of said springs.

2. An additional axle unit adapted to be attached to and detached from a wheel supported vehicle as desired, which vehicle has a frame, axle means extending transversely of said frame, support wheels mounted on opposite ends of said axle means, a spring on each side of said vehicle extending longitudinally of said frame, means for pivotally connecting the front end of each spring to said frame, removable means for pivotally connecting the rear end of each spring to said frame, and means for pivotally interconnecting the mid-point of each spring to the adjacent end of said axle means whereby weight on each spring is equally transmitted to the adjacent end of said axle means, said additional axle unit comprising, bolster means, means for detachably connecting said bolster means in rigid weight supporting relationship to the rear end of said vehicle frame, an axle positioned to the rear of said bolster means and extending transversely of said unit, wheels mounted on opposite ends of said axle, a longitudinally extending load-distributing beam on each side of said unit pivotally connected at a location intermediate its ends to the adjacent end of said bolster means, and means for pivotally supporting the rear end of each of said beams on the adjacent end of said axle, the forward end of each of said beams being connectable in load-transmitting relationship to the rear end of each of said springs.

3. In combination with a wheel-supported vehicle having a frame, tandem rear axles, support wheels mounted on opposite ends of said axles, a leaf spring on each side of said vehicle extending longitudinally of said frame, means for pivotally connecting the front end of each leaf spring to said frame, removable means for pivotally connecting the rear end of each spring to said frame, a walking beam on each side of said vehicle, means for pivotally connecting the opposite ends of each walking beam to the adjacent ends of said tandem axles, and means for pivotally connecting the mid-point of each spring in load-transmitting relationship to the mid-point of the adjacent walking beam, a detachable axle unit comprising bolster means, means for detachably connecting said bolster means in rigid weight supporting relationship to the rear end of said vehicle frame and extending transversely of said unit, wheels mounted on opposite ends of said axle, a longitudinally extending load-distributing beam on each side of said unit pivotally connected at a location intermediate the ends thereof to the adjacent end of said bolster means, and means for pivotally supporting the rear end of each of said beams on the adjacent end of said axle, the forward end of each of said beams being connected in load-transmitting relationship to the rear end of the adjacent one of said leaf springs.

4. A third axle unit adapted to be readily attached and detached from the permanent frame of a vehicle comprising, a bolster extending transversely across said unit, means for detachably securing said bolster in weight supporting relationship to the rear end of a vehicle frame, a transverse shaft, means for pivotally supporting said bolster onto said shaft, a transverse axle located rearwardly of said shaft, support wheels mounted on opposite ends of said axle, a pair of load-distributing beams extending longitudinally along opposite sides of said unit, means for pivotally supporting the rear end of each of said beams on the adjacent end of said axle, and journal bearing means provided on each of said beams at a corresponding location intermediate the opposite ends thereof for tiltably mounting each of said beams to the adjacent end of said shaft.

5. A third axle unit adapted to be readily attached and detached from the permanent frame of a vehicle, comprising, an axle, support wheels mounted on opposite ends of said axle, an axle housing fitting over said axle, a pair of load transmitting beams extending along opposite sides of said unit in a front to rear direction, means for pivotally attaching the rear end of each of said beams to the adjacent end of said axle housing, a journal bearing mounted on each of said beams at a corresponding location intermediate the opposite ends thereof, a transverse shaft, the opposite ends of which are journaled in said bearings, a bolster disposed over said shaft, saddle members supporting the opposite ends of said bolster on the opposite ends of said shaft, and connecting means on said bolster for detachably connecting said unit in rigid load-supporting relationship to the rear end of a vehicle.

6. A third axle unit adapted to be readily attached and detached from the permanent frame of a vehicle, comprising, an axle, support wheels mounted on opposite ends of said axle, an axle housing fitting over said axle, a pair of load transmitting beams extending along opposite sides of said unit in a front to rear direction, means for pivotally attaching the rear end of each of said beams to the adjacent end of said axle housing, a journal bearing mounted on each of said beams at a corresponding location intermediate the opposite ends thereof, a transverse shaft the opposite ends of which are journaled in said bearings, a bolster disposed over said shaft, saddle members supporting the opposite ends of said bolster to the opposite ends of said shaft, a pair of sleeve members fitting over said shaft in between said beams, a pair of brace rods for each of said beams each of said rods being attached at one end to the adjacent sleeve member and the opposite end being attached to the adjacent load-transmitting beam at a location removed from said journal bearing thereon, and connecting means on said bolster for detachably connecting said unit in rigid load-supporting relationship to the rear end of a vehicle.

7. A third axle unit adapted to be readily attached and detached from the permanent frame of a vehicle, comprising, an axle, support wheels mounted on opposite ends of said axle, an axle housing fitting over said axle, a pair of load-transmitting beams extending along opposite sides of said unit in a front to rear direction, means for pivotally attaching the rear end of each of said beams to the top of the adjacent end of said axle housing, a torque rod, bracket means depending from said axle housing, means for pivotally connecting the rear end of said torque rod to the bottom end of said bracket means, means for pivotally attaching the front end of said torque rod to one of said beams forwardly of the rear end thereof, a journal bearing mounted on each of said beams at a corresponding location intermediate the opposite ends thereof, a transverse shaft the opposite ends of which are journaled in said bearings, a bolster disposed over said shaft, saddle members supporting the opposite ends of said bolster to the opposite ends of said shaft, and connecting means on said bolster for detachably connecting said unit in rigid load-supporting relationship to the rear end of a vehicle.

8. A third axle unit adapted to be attached and detached from the rear end of a vehicle as desired, which vehicle comprises a chassis frame which includes a pair of rearwardly projecting side frame members, tandem rear axles located underneath said chassis frame support wheel mounted on opposite ends of said tandem axles, a leaf spring on each side of said vehicle extending longitudinally underneath the adjacent side frame member, means for pivotally connecting the front end of each leaf spring to the underside of the adjacent side frame member, removable means on each of said side frame members for engaging the rear end of the adjacent leaf spring in load-transmitting relationship, a walking beam on each side of said vehicle, means for pivotally attaching the opposite ends of said walking beams to the adjacent ends of said tandem axles and means for pivotally supporting each of said leaf springs at its mid-point on the mid-point of the adjacent walking beam, said third axle unit comprising, a third axle, support wheels mounted on opposite ends of said axle, an axle housing fitting over said third axle, a pair of load transmitting beams extending along opposite sides of said unit in a front to rear direction, means for pivotally attaching the rear end of each beam to the top of the adjacent end of said axle housing, a torque rod, bracket means depending from said axle housing, means for pivotally connecting the rear end of said torque rod to the bottom end of said bracket means, means for pivotally attaching the front end of said torque rod to one of said beams forwardly of the rear end thereof, a journal bearing mounted on each of said beams at the mid-point thereof, a transverse shaft having the opposite ends thereof journaled in said bearings, a bolster disposed over said shaft, saddle members each of which straddles one of said beams and is attached to said shaft so as to support said bolster thereon, a pair of sleeve members fitting over said shaft inbetween said beams, a pair of brace rods for each of said beams with each rod being fastened at one end to the adjacent sleeve and the opposite end being attached to the adjacent load transmitting beam at a location removed from the mid-point thereof, and fixtures on opposite ends of said bolster for rigidly attaching the bolster to the overhanging rear end of one of said vehicle side frame members, said fixtures comprising a vertical plate which engages the rear end of the adjacent vehicle side frame member, a hook member which hooks over a flange on the adjacent vehicle side frame member, and at least one apertured forwardly projecting ear for cooperation with an apertured lug depending from the adjacent vehicle side frame member so as to receive a locking pin through the registering apertures.

References Cited in the file of this patent
UNITED STATES PATENTS

| | | |
|---|---|---|
| 1,620,809 | Fager | Mar. 15, 1927 |
| 1,934,670 | Hickman | Nov. 7, 1933 |
| 1,989,745 | Farris | Feb. 5, 1935 |
| 2,067,861 | Robin | Jan. 12, 1937 |
| 2,351,001 | Buckendale | June 13, 1944 |
| 2,665,142 | Talbert | Jan. 5, 1954 |
| 2,682,420 | Chelf | June 29, 1954 |